US012111393B2

(12) United States Patent
Behnamfar et al.

(10) Patent No.: US 12,111,393 B2
(45) Date of Patent: Oct. 8, 2024

(54) ELECTRONIC DEVICES WITH MULTI-ANTENNA SENSING

(71) Applicant: Apple Inc., Cupertino, CA (US)

(72) Inventors: Firouz Behnamfar, Los Gatos, CA (US); Christian W Mucke, Portimao (PT); Ayman F Naguib, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 235 days.

(21) Appl. No.: 17/893,034

(22) Filed: Aug. 22, 2022

(65) Prior Publication Data

US 2023/0085972 A1    Mar. 23, 2023

Related U.S. Application Data

(60) Provisional application No. 63/246,636, filed on Sep. 21, 2021.

(51) Int. Cl.
*G01S 13/89* (2006.01)
*G01S 5/02* (2010.01)
(Continued)

(52) U.S. Cl.
CPC ............ *G01S 13/89* (2013.01); *G01S 5/0246* (2020.05); *G01S 5/02521* (2020.05);
(Continued)

(58) Field of Classification Search
CPC .... G01S 13/89; G01S 5/02521; G01S 5/0246; G01S 13/38
(Continued)

(56) References Cited

U.S. PATENT DOCUMENTS 9,367,785 B2    6/2016  Sabesan et al.
9,575,175 B2 *  2/2017  Grooters ............... G01S 13/933
(Continued)

FOREIGN PATENT DOCUMENTS

DE    102010048896 A1    4/2012
DE    102016224945 A1    6/2018
DE    102019217063 A1    5/2021

OTHER PUBLICATIONS

Vukmirovic, Nenad et al., Position estimation with a millimeter-wave massive MIMO system based on distributed steerable phased antenna arrays, EURASIP Journal on Advances in Signal Processing, 2018, pp. 1-17, Springer Open, Chambersburg, PA, United States.
(Continued)

*Primary Examiner* — Bo Fan
(74) *Attorney, Agent, or Firm* — Treyz Law Group, P.C.; Michael H. Lyons (57) ABSTRACT

An electronic device may include wireless circuitry that detects the location of external objects. A signal generator may concurrently transmit different radio-frequency ranging signals over two or more transmit antennas. The ranging signals may include waveforms with time-varying frequencies, where each waveform includes frequencies that are non-overlapping with the frequencies of each of the other waveforms at any given time. Antennas may receive reflected versions of the ranging signals and a processor may process the reflected versions of the ranging signals to identify the location of the external objects. This may prevent interference between the ranging signals and may significantly reduce the latency of location detection relative to examples where the ranging signals are transmitted by different transmit antennas in series.

20 Claims, 6 Drawing Sheets

(51) Int. Cl.
*G01S 13/38* (2006.01)
*H04L 5/00* (2006.01)
*H04W 64/00* (2009.01)

(52) U.S. Cl.
CPC .......... *G01S 13/38* (2013.01); *H04W 64/003* (2013.01); *H04L 5/0055* (2013.01)

(58) Field of Classification Search
USPC .............................. 342/22, 29, 61, 104, 149
See application file for complete search history.

(56) References Cited

U.S. PATENT DOCUMENTS

| | | |
|---|---|---|
| 9,924,381 B2 | 3/2018 | Siomina et al. |
| 10,436,890 B2 | 10/2019 | Loesch et al. |
| 2009/0315761 A1 | 12/2009 | Walter et al. |
| 2010/0103023 A1 | 4/2010 | Ogawa |
| 2014/0313071 A1* | 10/2014 | McCorkle ............. G01S 13/106 342/202 |

OTHER PUBLICATIONS

Bober, Kai Lennert et al., Distributed Multiuser MIMO for LiFi in Industrial Wireless Applications, Journal of Lightwave Technology, Jun. 1, 2021, pp. 3420-3433, vol. 39, No. 11, IEEE, New York, NY, United States.

* cited by examiner

ELECTRONIC DEVICES WITH MULTI-ANTENNA SENSING

This application claims the benefit of U.S. Provisional Patent Application No. 63/246,636, filed Sep. 21, 2021, which is hereby incorporated by reference herein in its entirety.

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is sometimes used to perform spatial ranging operations in which radio-frequency signals are used to estimate a distance between the electronic device and an external object.

It can be challenging to provide wireless circuitry that accurately estimates this distance, particularly in scenarios where multiple external objects are present and/or moving within the field of view of the wireless circuitry.

SUMMARY

An electronic device may include wireless circuitry. The wireless circuitry may include spatial ranging circuitry and antennas. The spatial ranging circuitry may detect the location of multiple external objects using radio-frequency signals. The spatial ranging circuitry may include a signal generator that concurrently transmits different radio-frequency ranging signals over respective transmit antennas in a set of two or more transmit antennas. The ranging signals may include waveforms with time-varying frequencies, where each waveform includes frequencies that are non-overlapping with the frequencies of each of the other waveforms at any given time. As examples, the ranging signals may include frequency ramps or frequency step functions.

A set of one or more antennas may receive reflected versions of the radio-frequency ranging signals transmitted by the set of transmit antennas. One or more processors may process the reflected versions of the radio-frequency ranging signals received by the set of antennas to identify the location of one or more external objects. Transmitting the ranging signals using waveforms that are non-overlapping in frequency may prevent interference between the ranging signals and may allow the one or more processors to distinguish each of the ranging signals transmitted and received by each pair of antennas. Concurrently transmitting the ranging signals may significantly reduce the latency of location detection relative to examples where the ranging signals are transmitted by different transmit antennas in series.

An aspect of the disclosure provides an electronic device. The electronic device can include a signal generator configured to generate a first radio-frequency signal having a first waveform and a second radio-frequency signal having a second waveform, the first waveform and the second waveform having non-overlapping frequencies as a function of time. The electronic device can include a first antenna configured to transmit the first radio-frequency signal. The electronic device can include a second antenna configured to transmit the second radio-frequency signal concurrent with transmission of the first radio-frequency signal by the first antenna. The electronic device can include a set of one or more antennas configured to receive a reflected version of the first radio-frequency signal and a reflected version of the second radio-frequency signal. The electronic device can include one or more processors configured to identify a location of one or more external objects based on the reflected version of the first radio-frequency signal and the reflected version of the second radio-frequency signal received by the set of one or more antennas.

An aspect of the disclosure provides a method of operating an electronic device to perform radio-frequency spatial ranging. The method can include with a first antenna, transmitting a first radio-frequency signal that includes a first linear frequency ramp increasing in frequency from a first time to a second time. The method can include with a second antenna, concurrent with transmission of the first radio-frequency signal by the first antenna, transmitting a second radio-frequency signal that includes a second linear frequency ramp decreasing in frequency from the first time to the second time. The method can include with a set of one or more antennas, receiving a reflected version of the first radio-frequency signal and a reflected version of the second radio-frequency signal. The method can include with one or more processors, identifying a location of one or more external objects based on the reflected version of the first radio-frequency signal and the reflected version of the second radio-frequency signal received by the set of one or more antennas.

An aspect of the disclosure provides an electronic device. The electronic device can include a first antenna. The electronic device can include a second antenna. The electronic device can include a set of antennas. The electronic device can include a signal generator configured to transmit, over the first antenna, a first radio-frequency signal that includes a first step function that increases in frequency from a first time to a second time and configured to concurrently transmit, over the second antenna, a second radio-frequency signal that includes a second step function that decreases in frequency from the first time to the second time, the set of antennas being configured to receive a reflected version of the first radio-frequency signal and a reflected version of the second radio-frequency signal. The electronic device can include one or more processors configured to identify a location of one or more external objects based on the reflected version of the first radio-frequency signal and the reflected version of the second radio-frequency signal received by the set of antennas.

DETAILED DESCRIPTION

Figure 1:
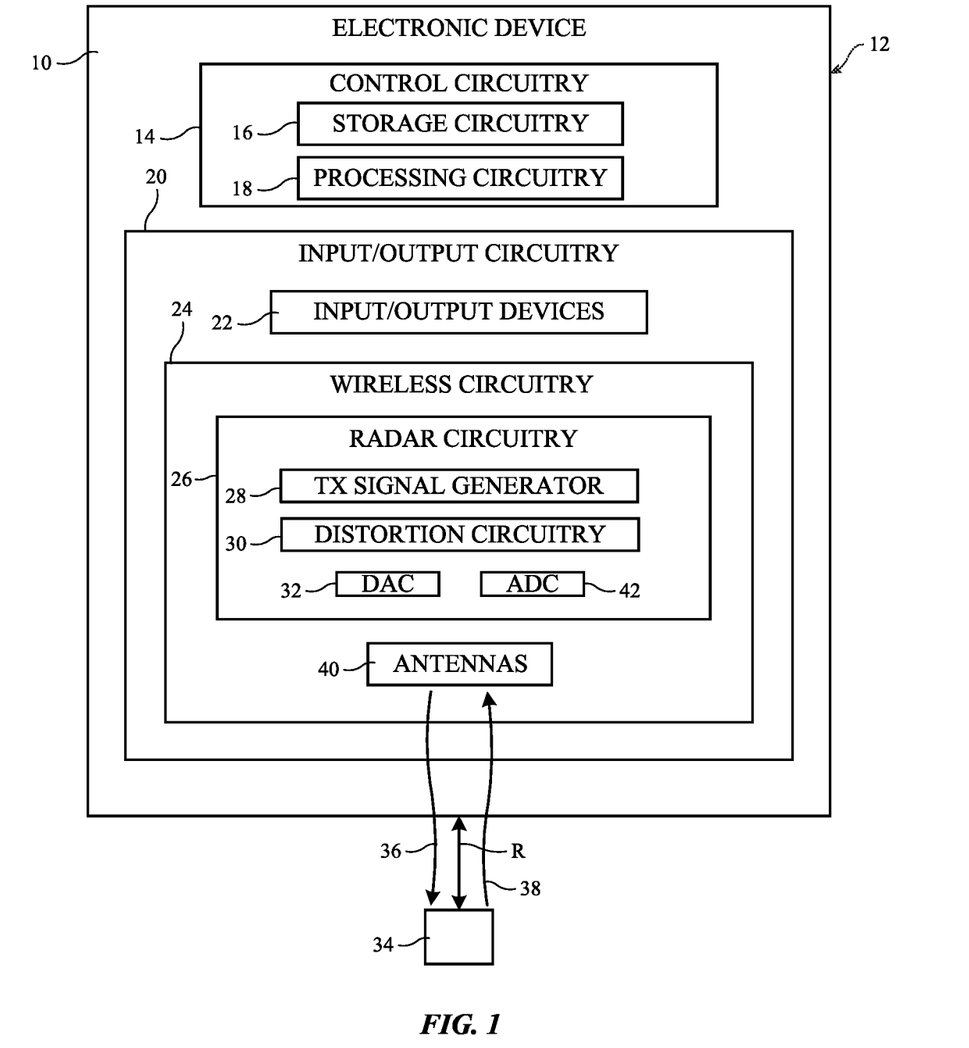
FIG. 1 is a functional block diagram of an illustrative electronic device having spatial ranging circuitry in accordance with some embodiments.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radar protocols), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include two or more antennas 40. Wireless circuitry 24 may also include baseband processor circuitry, transceiver circuitry, amplifier circuitry, filter circuitry, switching circuitry, radio-frequency transmission lines, and/or any other circuitry for transmitting and/or receiving radio-frequency signals using antennas 40.

Wireless circuitry 24 may transmit and/or receive radio-frequency signals within a corresponding frequency band at radio frequencies (sometimes referred to herein as a communications band or simply as a "band"). The frequency bands handled by wireless circuitry 24 may include wireless local area network (WLAN) frequency bands (e.g., Wi-Fi®

(IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHZ), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHZ), LA band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHZ), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest.

Antennas 40 may be formed using any desired antenna structures. For example, antennas 40 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 40 over time.

The radio-frequency signals handled by antennas 40 may be used to convey wireless communications data between device 10 and external wireless communications equipment (e.g., one or more other devices such as device 10). Wireless communications data may be conveyed by wireless circuitry 24 bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

The term "convey radio-frequency signals" as used herein means the transmission and/or reception of the radio-frequency signals (e.g., for performing unidirectional and/or bidirectional wireless communications with external wireless communications equipment). Antenna(s) 40 may transmit the radio-frequency signals by radiating the radio-frequency signals into free space (or to free space through intervening device structures such as a dielectric cover layer). Antenna(s) 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Wireless circuitry 24 may additionally or alternatively perform spatial ranging operations using antennas 40. In scenarios where wireless circuitry 24 both conveys wireless communications data and performs spatial ranging operations, one or more of the same antennas 40 may be used to both convey wireless communications data and perform spatial ranging operations. In another implementation, wireless circuitry 24 may include a set of antennas 40 that only conveys wireless communications data and a set of antennas 40 that is only used to perform spatial ranging operations.

When performing spatial ranging operations, antennas 40 may transmit radio-frequency signals 36. Wireless circuitry 24 may transmit radio-frequency signals 36 in a corresponding radio frequency band (e.g., a frequency band that includes frequencies greater than around 10 GHz, greater than around 20 GHz, less than 10 GHz, etc.). Radio-frequency signals 36 may reflect off objects external to device 10 such as external object 34. External object 34 may be, for example, the ground, a building, a wall, furniture, a ceiling, a person, a body part, an animal, a vehicle, a landscape or geographic feature, an obstacle, or any other object or entity that is external to device 10. Antennas 40 may receive reflected radio-frequency signals 38. Reflected signals 38 may be a reflected version of the transmitted radio-frequency signals 36 that have reflected off external object 34 and back towards device 10.

Control circuitry 14 may process the transmitted radio-frequency signals 36 and the received reflected signals 38 to detect or estimate the range R between device 10 and external object 34. If desired, control circuitry 14 may also process the transmitted and received signals to identify a two or three-dimensional spatial location (position) of external object 34, a velocity of external object 34, and/or an angle of arrival of reflected signals 38. In one implementation that is described herein as an example, wireless circuitry 24 performs spatial ranging operations using a frequency-modulated continuous-wave (FMCW) radar scheme. This is merely illustrative and, in general, other radar schemes or spatial ranging schemes may be used (e.g., an OFDM radar scheme, an FSCW radar scheme, a phase coded radar scheme, etc.).

To support spatial ranging operations, wireless circuitry 24 may include spatial ranging circuitry such as radar circuitry 26. In one embodiment that is sometimes described herein as an example, radar circuitry 26 includes FMCW radar circuitry that performs spatial ranging using an FMCW radar scheme. Radar circuitry 26 may therefore sometimes be referred to herein as FMCW radar circuitry 26. Radar circuitry 26 may use one or more antennas 40 to transmit radio-frequency signals 36 (e.g., as a continuous wave of radio-frequency energy under an FMCW radar scheme). One or more antennas 40 may also receive reflected signals 38 (e.g., as a continuous wave of radio-frequency energy under the FMCW radar scheme). Radar circuitry 26 may process radio-frequency signals 36 and reflected signals 38 to identify/estimate range R, the position of external object 34, the velocity of external object 34, and/or the angle-of-arrival of reflected signals 38. In embodiments where radar circuitry 26 uses an FMCW radar scheme, doppler shifts in the continuous wave signals may be detected and processed to identify the velocity of external object 34 and the time dependent frequency difference between radio-frequency signals 36 and reflected signals 38 may be detected and processed to identify range R and/or the position of external object 34. Use of continuous wave signals for estimating range R may allow control circuitry 10 to reliably distinguish between external object 34 and other background or slower-moving objects, for example.

As shown in FIG. 1, radar circuitry 26 may include transmit (TX) signal generator circuitry such as transmit signal generator 28. Transmit signal generator 28 may generate transmit signals for transmission over antenna(s) 40. In some implementations that are described herein as an example, transmit signal generator 28 includes a chirp generator that generates chirp signals for transmission over antenna(s) 40 (e.g., in embodiments where radar circuitry 26 uses an FMCW radar scheme). Transmit signal generator 28 may therefore sometimes be referred to herein as chirp generator 28. Transmit signal generator 28 may, for example, produce chirp signals that are transmitted as a continuous wave of radio-frequency signals 36. The chirp signals may be formed by periodically ramping up the frequency of the transmitted signals in a linear manner over time, for example.

Radar circuitry 26 may also include digital-to-analog converter (DAC) circuitry such as DAC 32. DAC 32 may convert the transmit signals (e.g., the chirp signals) from the digital domain to the analog domain prior to transmission by antennas 40 (e.g., in radio-frequency signals 36). Radar circuitry 26 may also include analog-to-digital converter (ADC) circuitry such as ADC 42. ADC 42 may convert signals from the analog domain to the digital domain for subsequent processing by control circuitry 14. While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24).

Radar circuitry 26 may perform spatial ranging operations using radio-frequency signals 36 and reflected signals 38 to detect the presence, position, orientation, and/or velocity of external object 34 at any given time and/or to track the presence, position, orientation, and/or velocity of external object 34 over time. The spatial ranging operations may sometimes be referred to herein as radio-frequency sensing operations. The spatial ranging operations may be used to identify user inputs or gestures performed by a user of device 10 or another person, to perform healthcare functions, to perform search and rescue operations, to perform security operations, to perform automotive operations, etc. The spatial ranging operations may allow wireless circuitry 24 to detect and track one or more persons (e.g., a user) without requiring the persons to also be holding an active device such as device 10.

Performing spatial ranging operations using radio-frequency signals allows wireless circuitry 24 to distinguish between animate external objects 34 such as persons from inanimate external objects such as walls, floors, furniture, etc. (e.g., because the radio-frequency spatial ranging may allow wireless circuitry 24 to rapidly detect and track movement of external object 34). For example, radar circuitry 26 may gather multiple measurements over time and may process differences between the measurements to identify movement of external object 34 (e.g., movement indicative of external object 34 being a human). However, in practice, sensing humans using radio-frequency signals can be very difficult because different humans move at different speeds in different contexts. In addition, making multiple measurements over time to identify humans can be very time consuming and can result in excessive latency in identifying location. Further, there are many scenarios in which there are multiple moving external objects 34 (e.g., people) within the field of view of antennas 40. If care is not taken, merely processing changes in distance gathered using radio-frequency signals 36 can be insufficient to properly detect and track multiple different external objects 34 (e.g., persons) in the vicinity of device 10.

Figure 2:
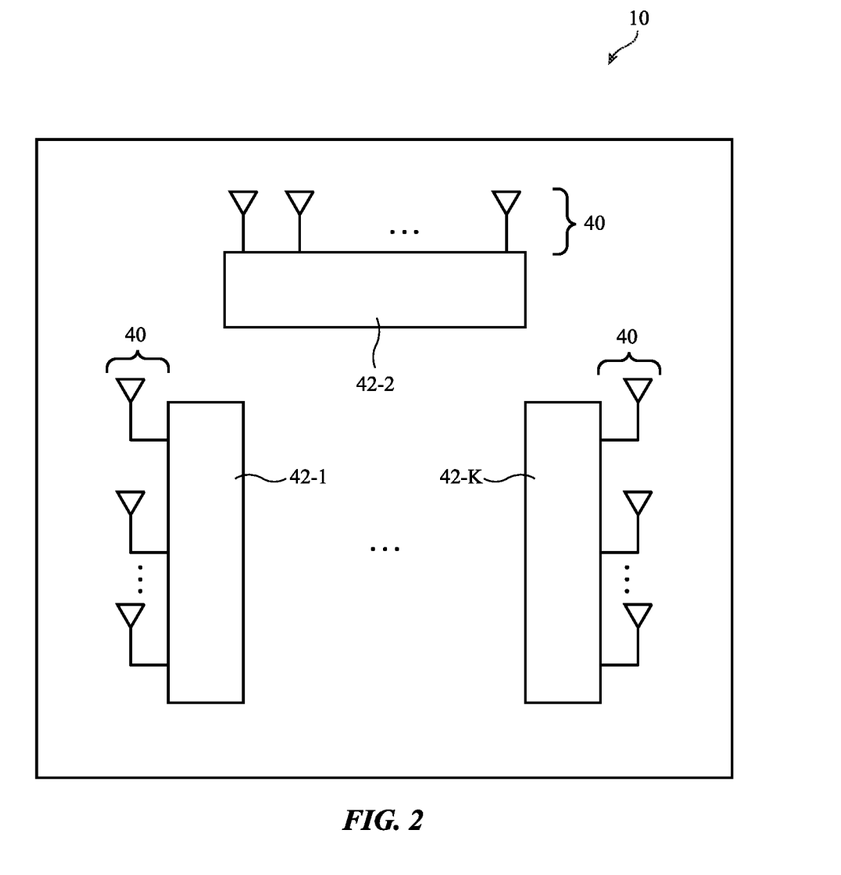
FIG. 2 is a diagram of an illustrative electronic device having multiple antennas across one or more antenna panels that may be used to perform spatial ranging operations in accordance with some embodiments.

To allow radar circuitry 26 to localize, detect, and/or track multiple animate external objects 34 (e.g., multiple moving persons) in the vicinity of device 10, radar circuitry 26 may use more than one antenna 40 to transmit radio-frequency signals 36 and may use more than one antenna 40 to receive reflected signals 38. FIG. 2 is a diagram showing how device 10 may include multiple antennas for transmitting radio-frequency signals 36 and for receiving reflected signals 38.

As shown in FIG. 2, device 10 may include one or more antenna panels 42 (e.g., a first antenna panel 42-1, a second antenna panel 42-2, a Kth antenna panel 42-K, etc.). Each antenna panel 42 may include one or more respective antennas 40. Each antenna panel 42 may, if desired, include a common substrate (module) to which each of the antennas 40 in that antenna panel 42 are mounted and/or a radio-frequency integrated circuit (chip) that includes control circuitry (e.g., phase and magnitude controllers, amplifiers, switches, filters, matching circuitry, transmission lines, etc.) for the antennas 40 in that antenna panel 42. Antenna panels 42 may sometimes also be referred to herein as antenna modules 42. Each antenna panel 42 may be disposed at a respective location on or in device 10. Disposing antenna panels 42 at different ends, edges, or corners of device 10 may help to maximize the accuracy and precision with which the antenna panels perform spatial ranging operations, for example. If desired, each of the antennas 40 on any given antenna panel 42 may form a phased antenna array that forms a signal beam oriented in a selected beam pointing angle (e.g., based on the phases provided to each antenna in the array) and/or different antennas 40 on different antenna panels 42 may form part of the same phased antenna array (sometimes referred to as a phased array antenna).

To detect multiple external objects 34 (or multiple portions of the same external object such as different body parts of a user) in the vicinity of device 10, radar circuitry 26 (FIG. 1) may use more than one antenna 40 (e.g., antennas 40 located at different spatial locations across device 10) to transmit radio-frequency signals 36 (sometimes referred to herein as transmit (TX) antennas) and may use more than one antenna 40 (e.g., antennas 40 located at different spatial locations across device 10) to receive reflected signals 38 (sometimes referred to herein as receive (RX) antennas). For example, multiple TX antennas 40 may transmit chirp signals in radio-frequency signals 36. However, radar circuitry 26 may be unable to resolve multiple external objects 34 when multiple TX antennas 40 transmit chirp signals at the same time, because the chirp signals would interfere with each other and control circuitry 14 would therefore be unable to distinguish between the chirp signals transmitted by each of the TX antennas.

To help mitigate these issues, the multiple TX antennas 40 may take turns transmitting chirp signals in series (sequence). For example, a first TX antenna 40 may transmit a first chirp signal and a first RX antenna 40 may receive a reflected version of the first chirp signal, a second TX antenna 40 may then transmit a second chirp signal and a second RX antenna 40 may receive a reflected version of the second chirp signal, etc. Sequential transmission in this way may prevent interference between the TX antennas to help control circuitry 14 to locate multiple external objects 34 but consumes an excessive amount of time and introduces excessive latency in identifying the locations of the external objects. Software applications running on device 10 that use the identified locations for other purposes will therefore experience excessive latency in performing other processing operations based on the identified locations.

Figure 3:
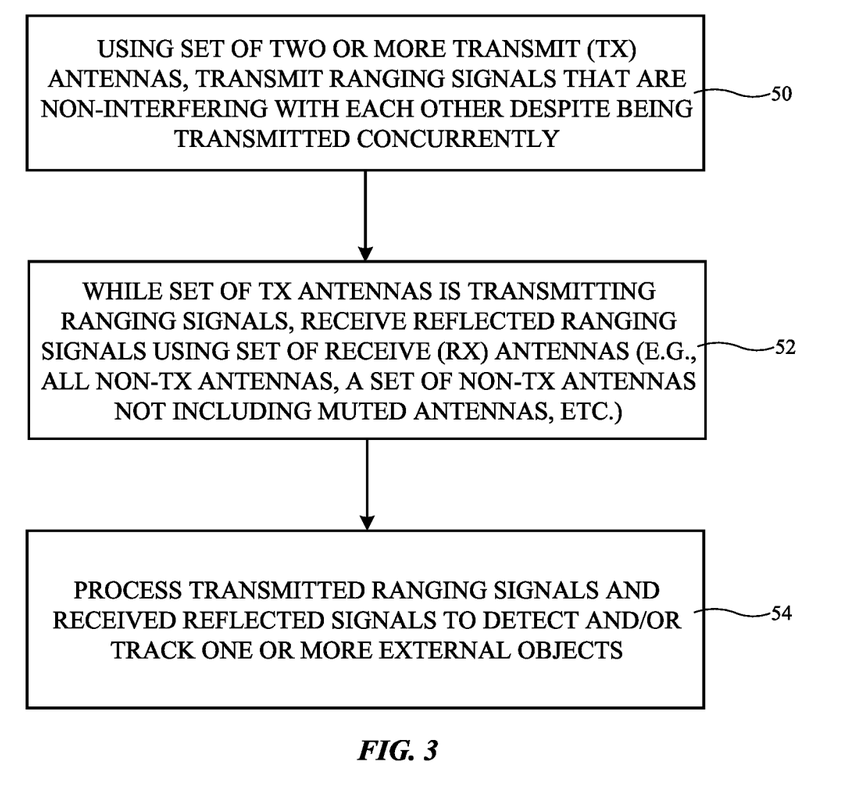
FIG. 3 is a flow chart of illustrative operations involved in using multiple antennas to transmit and receive spatial ranging signals while mitigating interference between the antennas in accordance with some embodiments.

To allow radar circuitry 26 to detect multiple external objects 34 (or multiple portions of the same external object such as different body parts of a user) while minimizing latency, radar circuitry 26 may generate ranging signals for concurrent transmission by multiple antennas 40 without interference between the ranging signals. FIG. 3 is a flow chart of illustrative operations involved in using radar circuitry 26 to perform spatial ranging operations using multiple concurrently active TX antennas without producing interference between the antennas.

At operation 50, radar circuitry 26 may use a set of TX antennas 40 to transmit spatial ranging signals (sometimes referred to herein as ranging signals). The set of TX antennas 40 may include two or more TX antennas 40. TX signal generator 28 may generate a respective ranging signal for each of the TX antennas in the set of TX antennas. Each of the TX antennas in the set of TX antennas may be on the same antenna panel 42 (FIG. 2) or different TX antennas in the set of TX antennas may be located on two or more antenna panels 42 (e.g., each of the TX antennas in the set of TX antennas may be located (disposed) on a respective antenna panel 42). If desired, one or more of the antenna panels 42 may be muted from transmitting ranging signals (e.g., antenna panels with insufficient signal-to-noise ratio (SNR)). TX signal generator 28 may generate the ranging signals using different waveforms for each TX antenna in the set of TX antennas, where the waveforms do not interfere with each other despite concurrent transmission over the set of TX antennas. For example, the waveforms may be such that no two TX antennas in the set of TX antennas transmit ranging signals at the same frequency at any given time. While the spatial ranging signals are sometimes referred to as not having the same frequency at any given time, "at any given time" as used herein allows for an instant in time (e.g., an instantaneous time, an extremely short overlapping time period on the order of a few sequential bits, or any sufficiently instantaneous time that is too short for measurable interference to be reasonably observed) in which the ranging signals transmitted by two of the antennas in the set of TX antennas are at the same frequency.

At operation 52, while the set of TX antennas is transmitting the ranging signals, a set of RX antennas 40 may receive reflected versions of the transmitted ranging signals that have reflected off one or more external objects 34 (e.g., as reflected signals 38 of FIG. 1). The set of RX antennas may include one or more RX antennas. The set of RX antennas may, if desired, include all the antennas 40 that are not being used as TX antennas. If desired, some of the antennas 40 (e.g., one or more antenna panels 42) may be disabled from receiving ranging signals during spatial ranging operations (e.g., antennas or antenna panels having insufficient received signal SNR). In these examples, the set of RX antennas may include all the antennas 40 that are not disabled and that are not TX antennas. In general, a greater number of RX antennas may increase the accuracy and precision with which control circuitry 14 is able to resolve the position of external object(s) 34. Each of the RX antennas in the set of RX antennas may be on the same antenna panel 42 (FIG. 2) or different RX antennas in the set of RX antennas may be located on two or more antenna panels 42 (e.g., each RX antenna may be located on a respective antenna panel 42). In some implementations, the set of RX antennas may include only a single antenna 40 on each antenna panel 42. Each RX antenna in the set of RX antennas may receive a reflected version of each of the ranging signals transmitted by each of the TX antennas.

At operation 54, control circuitry 14 (FIG. 1) may process the ranging signals transmitted by the set of TX antennas 40 and the reflected signals received by the set of RX antennas 40 to detect and/or track the presence, location, orientation, and/or velocity of one or more external objects 34 at one time or over time. Since each respective ranging signal is transmitted by a corresponding TX antenna 40 at a different frequency at all times, the ranging signals will not interfere with each other. For example, control circuitry 14 may process the signal received at each RX antenna in the set of RX antennas and may filter the received signal by frequency. Given the known frequency of the transmitted ranging signals, control circuitry 14 may identify (e.g., distinguish, determine, etc.) which of the transmitted ranging signals is present in the received signal at any given time to distinguish between each of the transmitted ranging signals in the received signal (and the corresponding TX antenna) despite the fact that the set of TX antennas concurrently transmitted all the ranging signals at the same time. Since control circuitry 14 can distinguish between each ranging signal in the received signal for each antenna, control circuitry 14 is subsequently able to detect the time of flight (TOF) for each ranging signal between each pair of TX antennas and RX antennas, which is then used to determine (e.g., compute, calculate, identify, estimate, etc.) the distance between each external object 34 and each TX antenna and the distance between each external object 34 and each RX antenna. Control circuitry 14 may process these distances to resolve the true location, orientation, and/or velocity of each external object 34 relative to device 10. Control circuitry 14 may perform any desired subsequent processing operations based on the identified location, orientation, and/or velocity of each external object 34.

Figure 4:
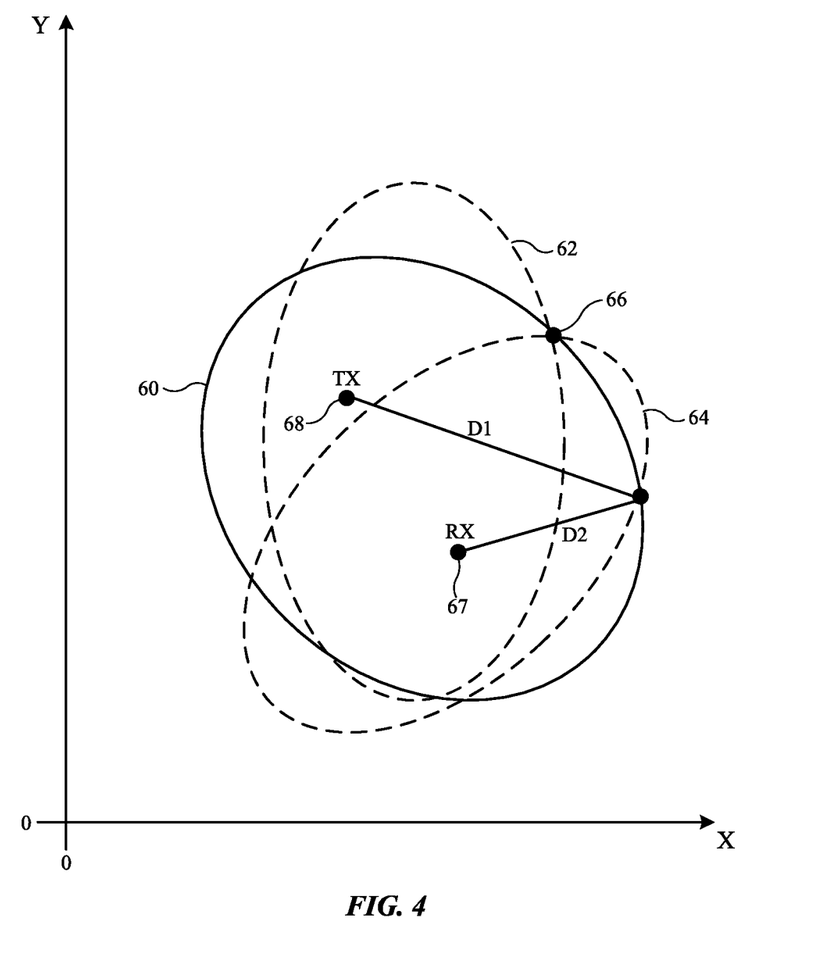
FIG. 4 is a plot showing one example of how distances gathered using different pairs of transmit and receive antennas may be processed to identify the location of an external object in accordance with some embodiments.

FIG. 4 is a diagram showing one example of how control circuitry 14 may process transmitted and received ranging signals from different pairs of TX and RX antennas to identify the location of a single external object 34 (e.g., while processing operation 54 of FIG. 3). The X-axis of FIG. 4 plots a first spatial coordinate and the Y-axis of FIG. 4 plots a second spatial coordinate (e.g., along orthogonal Cartesian axes). Point 68 represents the spatial location of a first TX antenna in device 10. Point 67 represents the spatial location of a first RX antenna in device 10.

Control circuitry 14 may use the known waveform of the ranging signal transmitted by the TX antenna at location 68 (e.g., as transmitted while processing operation 50 of FIG. 3) to identify the reflected version of that ranging signal in the signal received by the RX antenna at location 67 (e.g., as received while processing operation 52 of FIG. 3), because each of the ranging signals transmitted by the set of TX antennas has a different respective frequency at each moment in time. Control circuitry 14 may then process the ranging signal transmitted by the TX antenna at location 68 and the reflected version of the ranging signal transmitted by the TX antenna at location 68 as received by the RX antenna at location 67 to identify (e.g., determine, generate, compute, calculate, estimate, etc.) that the external object 34 that reflected the ranging signal is located at a distance D1 from the TX antenna at location 68 and is located at a distance D2 from the RX antenna at location 67. In other words, control circuitry 14 may identify an ellipse 60 of points at which external object 34 may be located (e.g., where each point on ellipse 60 is located distance D1 from point 68 and distance D2 from point 67). The example of FIG. 4 is not to scale.

Control circuitry 14 may repeat this process for the ranging signal transmitted by a second pair of TX and RX antennas (e.g., the TX antenna located at point 68 and a second RX antenna located at a point other than point 67, a second TX antenna located at a point other than point 68 and the RX antenna located at point 67, or a TX antenna located at a point other than point 68 and an RX antenna located at a point other than point 67) to generate an additional ellipse such as ellipse 62 of points at which external object 34 may be located (e.g., external object 34 may be located at any of the intersections of ellipses 60 and 62). To resolve any ambiguity in the position of external object 34, control circuitry 14 may repeat this process for the ranging signal transmitted by a third pair of TX and RX antennas to generate an additional ellipse such as ellipse 64 of points at which external object 34 may be located. Control circuitry 14 may then identify the location of external object 34 as the point at which ellipses 62, 64, and 60 intersect. In the example of FIG. 4, external object 34 is located at point 66. This process may be repeated for every combination of TX antennas in the set of TX antennas and RX antennas in the set of RX antennas to resolve the location of each external object 34, for example. If desired, control circuitry 14 may identify these ellipses after taking an inverse Fast Fourier Transform (iFFT) of the received signal and subtracting a reference snapshot (e.g., as taken by the IFFT at a previous time used as a reference). If desired, users (e.g., external objects 34) may be located based on SNR where the ellipses overlap and, when SNR is below a threshold, the detection/localization may terminate.

Performing spatial ranging operations in this way may significantly reduce the latency with which control circuitry 14 detects the location of external object(s) 34 relative to scenarios where ranging signals are sequentially transmitted by different TX antennas (e.g., without requiring additional hardware). In the example of FIG. 4, only three measurements are used to detect the location of external object 34. This is merely illustrative and, in general, any desired number of measurements may be used (e.g., 20-40 or more sequential transmissions of the ranging signals by each of the TX antennas in the set of TX antennas in parallel). This may also reduce the snapshot window time with which external objects 34 are located, thereby giving the environment less time to change during measurement. This may help to minimize the presence of ghost images of external objects 34 in the location data (e.g., measurements of the location of external object 34) gathered using radar circuitry 26 and may eliminate coherence time expiry issues.

Figure 5:
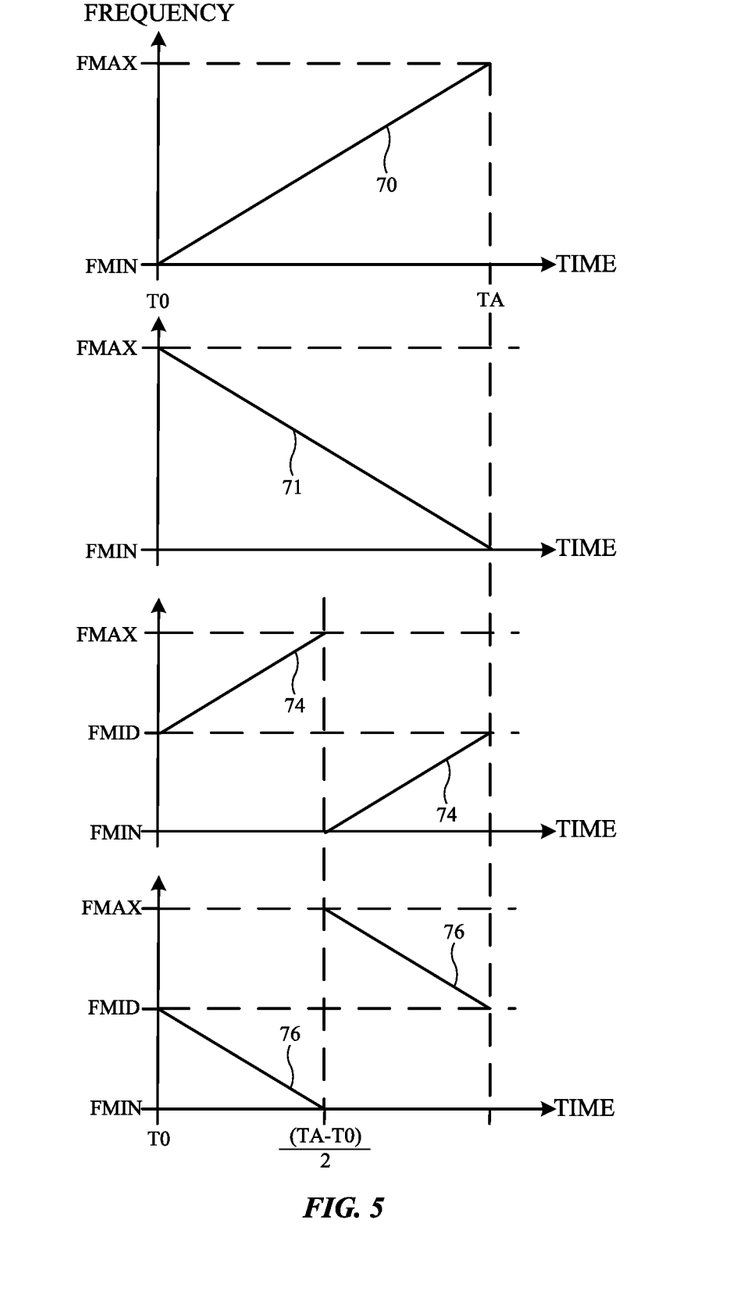
FIG. 5 is a plot of illustrative spatial ranging signals (in frequency as a function of time) that include linear frequency ramps for concurrent transmission by different antennas without generating interference between the antennas in accordance with some embodiments.

In general, the ranging signals transmitted by the set of TX antennas may include any desired ranging signals that do not have the same frequency at any given time (e.g., while allowing for an instantaneous time or an extremely short overlapping time period that does not produce measurable or substantial interference). As one example, each of the ranging signals may include a respective linear frequency ramp. FIG. 5 is a plot of frequency as a function of time that shows four illustrative ranging signals with linear frequency ramps that may be concurrently transmitted by a set of four TX antennas 40 (e.g., while processing operation 50 of FIG. 3).

As shown in FIG. 5, curve 70 plots a first ranging signal transmitted by a first TX antenna in the set of TX antennas. Curve 72 plots a second ranging signal transmitted by a second TX antenna in the set of TX antennas. Curve 74 plots a third ranging signal transmitted by a third TX antenna in the set of TX antennas. Curve 76 plots a fourth ranging signal transmitted by a fourth TX antenna in the set of TX antennas.

As shown by curve 70, the first ranging signal may include a positive-slope linear frequency ramp (e.g., chirp) that increases from a minimum frequency FMIN at time T0 to a maximum frequency FMAX at time TA. Mathematically, the first ranging signal may be represented by the function $f_1(t)$=FMIN+a*t for T0<t<TA, where a is the slope of the line given by a=(FMAX−FMIN)/(TA−T0). As shown by curve 72, the second ranging signal may include a negative-slope linear frequency ramp that decreases from maximum frequency FMAX at time T0 to minimum frequency FMIN at time TA. Mathematically, the second ranging signal may be represented by the function $f_2(t)$=FMIN−a*t for T0≤t≤TA. As shown by curves 70 and 72, the first and second ranging signals are each at a different respective frequency for all times between time T0 and time TA (e.g., except for the instantaneous time at (TA−T0)/2 at which the ranging signals instantaneously exhibit the same frequency), thereby allowing for concurrent transmission of both ranging signals without interference. The first and second ranging signals are still referred to herein as having different frequencies at all times between times T0 and TA (e.g., as having non-overlapping frequencies as a function of time) despite the instantaneous overlap at time (TA−T0)/2 (e.g., this instantaneous time may be insufficient to result in measurable and/or substantial interference between the ranging signals). Nevertheless, if desired, the first and/or second ranging signal may be instantaneously muted at time (TA−T0)/2.

As shown by curve 74, the third ranging signal may include a positive-slope linear frequency ramp that increases from frequency FMID (e.g., a midpoint or average frequency equal to (FMAX−FMIN)/2) at time T0 to frequency FMAX at time (TA−T0)/2 and that increases from frequency FMIN at time (TA−T0)/2 to frequency FMID at time TA. Mathematically, the third ranging signal may be represented by the function $f_3(t)$=(FMIN+FMAX)/2+a*t for T0≤t≤(TA−T0)/2 and FMIN+a*(t−(TA−T0)/2) for (TA−T0)/2<t≤T. As shown by curves 70, 72, and 74, the first, second, and third ranging signals are each at a different respective frequency for all times between time T0 and time TA.

As shown by curve 76, the fourth ranging signal may include a negative-slope linear frequency ramp that decreases from frequency FMID at time T0 to frequency FMIN at time (TA T0)/2 and that decreases from frequency FMAX at time (TA−T0)/2 to frequency FMID at time TA. Mathematically, the fourth ranging signal may be represented by the function $f_4(t)$=(FMIN+FMAX)/2−a*t for T0≤t≤(TA−T0)/2 and FMAX−a*(t−(TA−T0)/2) for (TA−T0)/2<t≤T. As shown by curves 70, 72, 74, and 76, the first, second, third, and fourth ranging signals are each at a different respective frequency for all times between time T0 and time TA. The third and fourth ranging signals are still referred to herein as having different frequencies at all times between times T0 and TA (e.g., as having non-overlapping frequencies as a function of time) despite the instantaneous overlap at times T0, (TA−T0)/2, and TA (e.g., these instantaneous times may be insufficient to result in measurable and/or substantial interference between the ranging signals). Nevertheless, if desired, the third and/or fourth ranging signal may be instantaneously muted at times T0, (TA−T0)/2, and/or TA.

The four ranging signals shown in FIG. 5 may allow the set of TX antennas to include four TX antennas that each transmit a respective one of the four ranging signals without producing interference between the ranging signals. If desired, the set of TX antennas may include three TX antennas that each transmit a respective one of the four ranging signals of FIG. 5 or may include two TX antennas that each transmit a respective one of the four ranging signals of FIG. 5.

The linear frequency ramping scheme of FIG. 5 may be generalized to include 2N ranging signals for transmission over 2N TX antennas (e.g., when the set of TX antennas includes 2N TX antennas). For example, when the set of TX antennas includes 2N TX antennas and there is an available bandwidth of FMAX−FMIN, N of the TX antennas may begin at an initial frequency FMIN+(FMAX−FMIN)/(N×i), where i=0, . . . , N−1, and may linearly ramp up in frequency (e.g., at slope a). Meanwhile, the other N TX antennas in the set of 2N TX antennas may begin at an initial frequency FMIN−(FMAX−FMIN)/(N×i) where i=0, . . . , N−1, and may linearly ramp down in frequency (e.g., at slope −a). When an extreme of the bandwidth is reached, each TX antenna may cycle back and continue from the other extreme.

Figure 6:
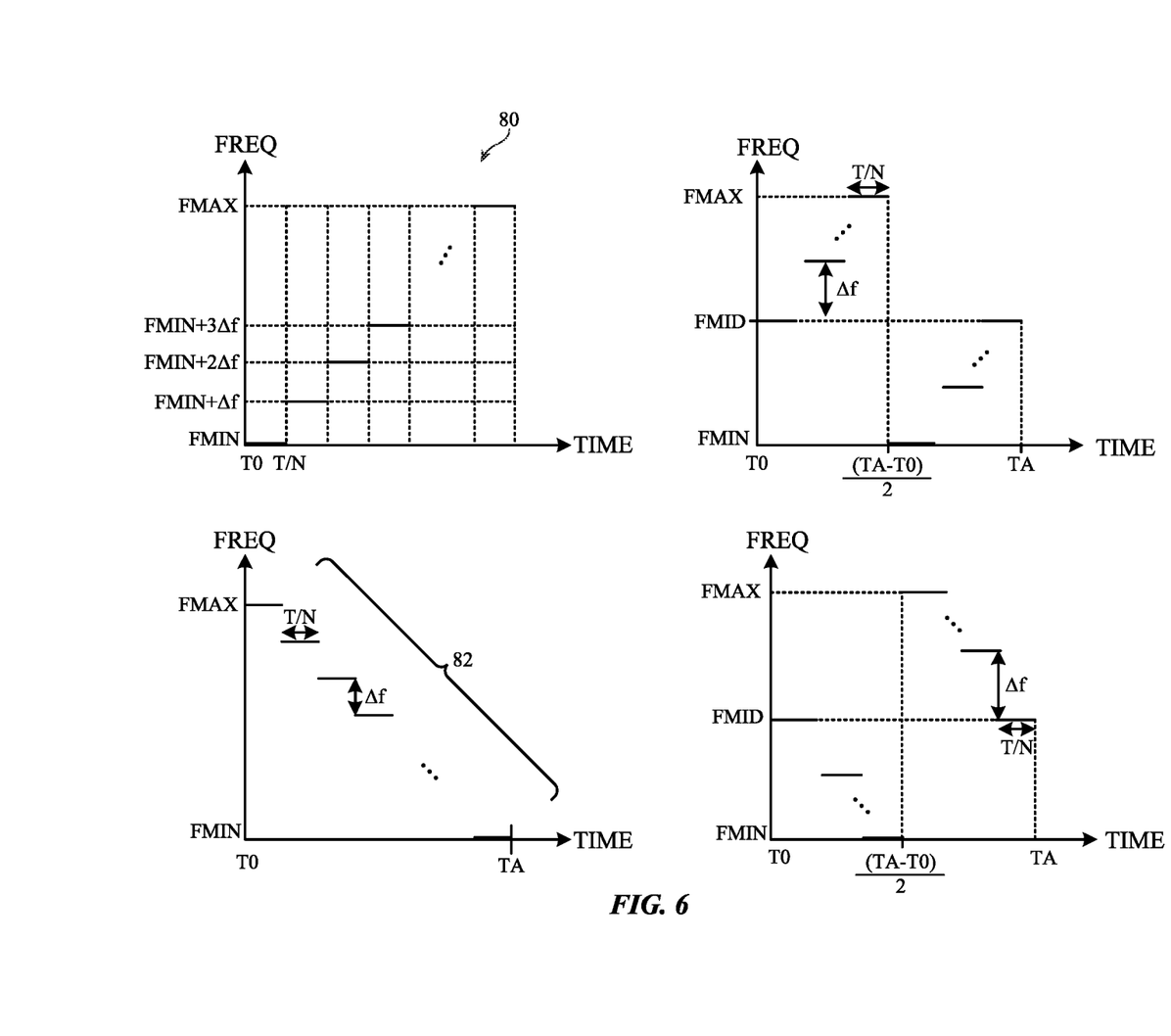
FIG. 6 is a plot of illustrative spatial ranging signals (in frequency as a function of time) that include frequency staircases for concurrent transmission by different antennas without generating interference between the antennas in accordance with some embodiments.

The example of FIG. 5 in which the ranging signals include linear frequency ramps is merely illustrative. If desired, the ranging signals may include frequency staircases that increase or decrease frequency at each TX antenna within the available bandwidth. FIG. 6 is a plot of frequency as a function of time that shows four illustrative ranging signals with frequency staircases (step-functions) that may be concurrently transmitted by a set of four TX antennas 40 (e.g., while processing operation 50 of FIG. 3).

As shown in FIG. 6, curve 80 plots a first ranging signal transmitted by a first TX antenna in the set of TX antennas. Curve 82 plots a second ranging signal transmitted by a second TX antenna in the set of TX antennas. Curve 84 plots a third ranging signal transmitted by a third TX antenna in the set of TX antennas. Curve 86 plots a fourth ranging signal transmitted by a fourth TX antenna in the set of TX antennas.

As shown by curve 80, the first ranging signal may include a frequency staircase (e.g., step-function) that increases from minimum frequency FMIN at time T0 to maximum frequency FMAX at time TA. The frequency staircase may include N steps (e.g., constant frequency periods) that are separated by frequency gap Δf=(FMAX−FMIN)/N. Each constant frequency period may last for duration (TA−T0)/N. Mathematically, the first ranging signal may be represented by the (step) function $f_1[n]$=FMIN+n*Δf, where 0≤n≤N and n=floor(N*t/(TA−T)).

As shown by curve 82, the second ranging signal may include a frequency staircase (e.g., step-function) that decreases from maximum frequency FMAX at time T0 to minimum frequency FMIN at time TA. The frequency staircase may include N steps (e.g., constant frequency periods) that are separated by frequency gap Δf. Each constant frequency period may last for duration (TA−T0)/N. Mathematically, the second ranging signal may be represented by the (step) function $f_2[n]$=FMAX−n*Δf, where 0≤n≤N and n=floor(N*t/(TA−T)). As shown by curves 80 and 82, the first and second ranging signals are each at a different respective frequency for all times between time T0 and time TA, thereby allowing for concurrent transmission of both ranging signals without interference. If desired, the first and/or second ranging signal may be muted at any periods where the signals would otherwise overlap.

As shown by curve 84, the third ranging signal may include a frequency staircase (e.g., step-function) that increases from frequency FMID at time T0 to maximum frequency FMAX at time (TA−T0)/2 and that increases from frequency FMIN at time (TA−T0)/2 to frequency FMID at time TA. Mathematically, the third ranging signal may be represented by the (step) function $f_3[n]$=(FMIN+FMAX)/2+n*Δf when 0≤n<N/2 and FMIN+(n−N/2)*Δf when N/2≤n≤N. As shown by curves 80, 82, and 84, the first, second, and third ranging signals are each at a different respective frequency for all times between time T0 and time TA.

As shown by curve 86, the fourth ranging signal may include a frequency staircase (e.g., step-function) that decreases from frequency FMID at time T0 to minimum frequency FMIN at time (TA−T0)/2 and that decreases from frequency FMAX at time (TA−T0)/2 to frequency FMID at time TA. Mathematically, the fourth ranging signal may be represented by the (step) function $f_4[n]$=(FMIN+FMAX)/2−n*Δf when 0≤n<N/2 and FMAX−(n−N/2)*Δf when N/2≤n≤N. As shown by curves 80, 82, 84, and 86, the first, second, third, and fourth ranging signals are each at a different respective frequency for all times between time T0 and time TA.

The four ranging signals shown in FIG. 6 may allow the set of TX antennas to include four TX antennas that each transmit a respective one of the four ranging signals without producing interference between the ranging signals. If desired, the set of TX antennas may include three TX antennas that each transmit a respective one of the four ranging signals of FIG. 6 or may include two TX antennas that each transmit a respective one of the four ranging signals of FIG. 6.

The frequency staircase scheme of FIG. 6 may be generalized to include 2N ranging signals for transmission over 2N TX antennas (e.g., when the set of TX antennas includes 2N TX antennas). For example, when the set of TX antennas includes 2N TX antennas and there is an available bandwidth of FMAX−FMIN, N of the TX antennas may begin at an initial frequency FMIN+(FMAX−FMIN)/(N×i), where i=0, . . . , N−1, and may go to the next higher-frequency sub-carrier to increase frequency. Meanwhile, the other N TX antennas in the set of 2N TX antennas may begin at an initial frequency FMIN−(FMAX−FMIN)/(N×i) where i=0, . . . , N−1, and may go to the next lower-frequency sub-carrier to decrease frequency. When an extreme of the bandwidth is reached, each TX antenna may cycle back and continue from the other extreme.

The example of FIGS. 5 and 6 are merely illustrative. In general, the ranging signals may have any desired waveforms that have non-overlapping frequencies from time T0 to TA (e.g., where the waveforms are still referred to as non-overlapping when two of the waveforms instantaneously overlap at some point between time T0 and time TA or when the overlap would have no measurable or substantial effect on the interference between the ranging signals). In other words, curves 70-76 of FIG. 5 and curves 80-86 of FIG. 6 may have other shapes.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-6 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. An electronic device comprising:
    a signal generator configured to generate a first radio-frequency signal having a first waveform and a second radio-frequency having a second waveform, the first waveform and the second waveform having non-overlapping frequencies as a function of time;
    a first antenna configured to transmit the first radio-frequency signal;
    a second antenna configured to transmit the second radio-frequency signal concurrent with transmission of the first radio-frequency signal by the first antenna;
    a set of one or more antennas configured to receive a reflected version of the first radio-frequency signal and a reflected version of the second radio-frequency signal, wherein the set of one or more antennas is different from the first antenna and the second antenna; and
    one or more processors configured to identify a location of one or more external objects based on the reflected version of the first radio-frequency signal and the reflected version of the second radio-frequency signal received by the set of one or more antennas.

2. The electronic device of claim 1, wherein the first waveform comprises a first linear frequency ramp and the second waveform comprises a second linear frequency ramp.

3. The electronic device of claim 2, wherein the first linear frequency ramp increases from a first frequency at a first time to a second frequency at a second time and wherein the second linear frequency ramp decreases from the second frequency at the first time to the first frequency at the second time.

4. The electronic device of claim 2, wherein the first linear frequency ramp increases from a first frequency at a first time to a second frequency greater than the first frequency at a second time subsequent to the first time and increases from a third frequency less than the first frequency at the second time to the first frequency at a third time subsequent to the second time and wherein the second linear frequency ramp decreases from the first frequency at the first time to the third frequency at the second time and decreases from the second frequency at the second time to the first frequency at the third time.

5. The electronic device of claim 4, wherein the signal generator is configured to generate a third radio-frequency signal having a third linear frequency ramp that increases from the third frequency at the first time to the second frequency at the third time and a fourth radio-frequency signal having a fourth linear frequency ramp that decreases from the second frequency at the first time to the third frequency at the third time, the electronic device further comprising:
    a third antenna configured to transmit the third radio-frequency signal concurrent with transmission of the first radio-frequency signal by the first antenna and transmission of the second radio-frequency signal by the second antenna; and
    a fourth antenna configured to transmit the fourth radio-frequency signal concurrent with transmission of the first radio-frequency signal by the first antenna, transmission of the second radio-frequency signal by the second antenna, and transmission of the third radio-frequency signal by the third antenna, wherein
        the set of one or more antennas is configured to receive a reflected version of the third radio-frequency signal and a reflected version of the fourth radio-frequency signal, and
        the one or more processors is configured to identify the location of the one or more external objects based on the reflected version of the third radio-frequency signal and the reflected version of the fourth radio-frequency signal received by the set of one or more antennas.

6. The electronic device of claim 1, wherein the signal generator is configured to generate a third radio-frequency signal having a third waveform and a fourth radio-frequency signal having a fourth waveform, the first waveform, the second waveform, the third waveform, and the fourth waveform having non-overlapping frequencies as a function of time;
    a third antenna configured to transmit the third radio-frequency signal concurrent with transmission of the second radio-frequency signal by the second antenna and transmission of the first radio-frequency signal by the first antenna; and
    a fourth antenna configured to transmit the fourth radio-frequency signal concurrent with transmission of the first radio-frequency signal by the first antenna, transmission of the second radio-frequency signal by the second antenna, and transmission of the third radio-frequency signal by the third antenna, wherein:
        the set of one or more antennas is configured to receive a reflected version of the third radio-frequency signal and a reflected version of the fourth radio-frequency signal, and
        the one or more processors is configured to identify the location of the one or more external objects based on the reflected version of the third radio-frequency signal and the reflected version of the fourth radio-frequency signal received by the set of one or more antennas.

7. The electronic device of claim 6, further comprising:
a first antenna panel that includes the first antenna;
a second antenna panel that includes the second antenna;
a third antenna panel that includes the third antenna; and
a fourth antenna panel that includes the fourth antenna.

8. The electronic device of claim 7, wherein the set of one or more antennas includes at least one antenna on the first antenna panel, at least one antenna on the second antenna panel, at least one antenna on the third antenna panel, and at least one antenna on the fourth antenna panel.

9. The electronic device of claim 1, wherein the first waveform comprises a first step function in frequency as a function of time and the second waveform comprises a second step function in frequency as a function of time.

10. The electronic device of claim 9, wherein the first step function increases from a first frequency at a first time to a second frequency at a second time and wherein the second step function decreases from the second frequency at the first time to the first frequency at the second time.

11. The electronic device of claim 9, wherein the first step function increases from a first frequency at a first time to a second frequency greater than the first frequency at a second time subsequent to the first time and increases from a third frequency less than the first frequency at the second time to the first frequency at a third time subsequent to the second time and wherein the second step function decreases from the first frequency at the first time to the third frequency at the second time and decreases from the second frequency at the second time to the first frequency at the third time.

12. The electronic device of claim 11, wherein the signal generator is configured to generate a third radio-frequency signal having a third step function that increases from the third frequency at the first time to the second frequency at the third time and a fourth radio-frequency having a fourth step function that decreases from the second frequency at the first time to the third frequency at the third time, the electronic device further comprising:
a third antenna configured to transmit the third radio-frequency signal concurrent with transmission of the first radio-frequency signal by the first antenna and transmission of the second radio-frequency signal by the second antenna; and
a fourth antenna configured to transmit the fourth radio-frequency signal concurrent with transmission of the first radio-frequency signal by the first antenna, transmission of the second radio-frequency signal by the second antenna, and transmission of the third radio-frequency signal by the third antenna, wherein
the set of one or more antennas is configured to receive a reflected version of the third radio-frequency signal and a reflected version of the fourth radio-frequency signal, and
the one or more processors is configured to identify the location of the one or more external objects based on the reflected version of the third radio-frequency signal and the reflected version of the fourth radio-frequency signal received by the set of one or more antennas.

13. A method of operating an electronic device to perform radio-frequency spatial ranging, the method comprising:
with a first antenna, transmitting a first radio-frequency signal that includes a first linear frequency ramp increasing in frequency from a first time to a second time;
with a second antenna, concurrent with transmission of the first radio-frequency signal by the first antenna, transmitting a second radio-frequency signal that includes a second linear frequency ramp decreasing in frequency from the first time to the second time;
with a set of one or more antennas, receiving a reflected version of the first radio-frequency signal and a reflected version of the second radio-frequency signal; and
with one or more processors, identifying a location of one or more external objects based on the reflected version of the first radio-frequency signal and the reflected version of the second radio-frequency signal received by the set of one or more antennas.

14. The method of claim 13, further comprising:
with a third antenna, concurrent with transmission of the first radio-frequency signal by the first antenna and transmission of the second radio-frequency signal by the second antenna, transmitting a third radio-frequency signal that includes a third linear frequency ramp increasing in frequency from the first time to the second time; and
with a fourth antenna, concurrent with transmission of the first radio-frequency signal by the first antenna, transmission of the second radio-frequency signal by the second antenna, and transmission of the third radio-frequency signal by the third antenna, transmitting a fourth radio-frequency signal that includes a fourth linear frequency ramp decreasing in frequency from the first time to the second time.

15. The method of claim 14, wherein the first linear frequency ramp increases from a first frequency at the first time to a second frequency at a third time subsequent to the second time, the second linear frequency ramp decreases from the second frequency at the first time to the first frequency at the third time, the third linear frequency ramp increases from a third frequency that is greater than the first frequency and less than the second frequency at the first time to the second frequency at the second time and increases from the first frequency at the second time to the third frequency at the third time, and the fourth linear frequency ramp decreases from the third frequency at the first time to the first frequency at the second time and decreases from the second frequency at the second time to the third frequency at the third time.

16. The method of claim 13, wherein the first linear frequency ramp increases from a first frequency at the first time to a second frequency at the second time and the second linear frequency ramp decreases from the second frequency at the first time to the first frequency at the second time.

17. The method of claim 13, wherein the first linear frequency ramp increases from a first frequency at the first time to a second frequency at the second time and the second linear frequency ramp decreases from the first frequency at the first time to a third frequency that is less than the first frequency at the second time.

18. The method of claim 17, further comprising:
with a third antenna, concurrent with transmission of the first radio-frequency signal by the first antenna and transmission of the second radio-frequency signal by the second antenna, transmitting a third radio-frequency signal that includes a third linear frequency ramp that increases from the third frequency at the first time to the first frequency at the second time; and
with a fourth antenna, concurrent with transmission of the first radio-frequency signal by the first antenna, transmission of the second radio-frequency signal by the second antenna, and transmission of the third radio-frequency signal by the third antenna, transmitting a fourth radio-frequency signal that includes a fourth linear frequency ramp that decreases from the second frequency at the first time to the first frequency at the second time.

19. An electronic device comprising:

a first antenna;

a second antenna;

a set of antennas;

a signal generator configured to transmit, over the first antenna, a first radio-frequency signal that includes a first step function that increases in frequency from a first time to a second time and configured to concurrently transmit, over the second antenna, a second radio-frequency signal that includes a second step function that decreases in frequency from the first time to the second time, the set of antennas being configured to receive a reflected version of the first radio-frequency signal and a reflected version of the second radio-frequency signal; and one or more processors configured to identify a location of one or more external objects based on the reflected version of the first radio-frequency signal and the reflected version of the second radio-frequency signal received by the set of antennas.

20. The electronic device of claim 19, wherein the first step function increases from a first frequency at the first time to a second frequency at the second time, the second step function decreases from the first frequency at the first time to a third frequency lower than the first frequency at the second time, and the electronic device further comprises:

a third antenna; and a fourth antenna, the signal generator being configured to transmit, over the third antenna, a third radio-frequency signal that includes a third step function that increases from the third frequency at the first time to the first frequency at the second time, and transmit, over the fourth antenna, a fourth radio-frequency signal that includes a fourth step function that decreases from the second frequency at the first time to the first frequency at the second time.

\* \* \* \* \*